United States Patent

Scheibel

[11] Patent Number: 5,999,862
[45] Date of Patent: Dec. 7, 1999

[54] COMMUNICATIONS EQUIPMENT IN A COMBAT VEHICLE

[75] Inventor: Axel Scheibel, Niestetal, Germany

[73] Assignee: Firma Wegman & Co. GmbH, Kassel, Germany

[21] Appl. No.: 08/968,241

[22] Filed: Nov. 12, 1997

[30] Foreign Application Priority Data

Dec. 2, 1996 [DE] Germany ............................ 196 49 926

[51] Int. Cl.$^6$ ............................... H01Q 3/22; H01Q 3/24
[52] U.S. Cl. .................................. 701/1; 701/23; 701/47; 701/213; 342/358; 342/361; 342/367; 342/373; 342/374; 342/383
[58] Field of Search .................................. 701/1, 23, 47, 701/213; 342/358, 361, 367, 373, 374, 383

[56] References Cited

U.S. PATENT DOCUMENTS

| | | | |
|---|---|---|---|
| 5,248,981 | 9/1993 | Yoshihara et al. ....................... | 342/357 |
| 5,289,193 | 2/1994 | Lenormand et al. .................... | 342/374 |
| 5,563,786 | 10/1996 | Torii ......................................... | 701/23 |
| 5,625,556 | 4/1997 | Janky et al. ............................... | 701/1 |
| 5,628,049 | 5/1997 | Suemitsu ................................. | 455/11.1 |
| 5,734,349 | 3/1998 | Lenormand et al. .................... | 342/373 |
| 5,777,579 | 7/1998 | Goetz et al. .............................. | 342/373 |
| 5,818,389 | 10/1998 | Lazar ........................................ | 342/383 |
| 5,825,762 | 10/1998 | Kamin, Jr. et al. ...................... | 370/335 |
| 5,861,841 | 1/1999 | Gildea et al. ........................ | 342/357.12 |
| 5,898,902 | 4/1999 | Tuzov ..................................... | 455/13.1 |
| 5,929,809 | 7/1999 | Erlick et al. ............................. | 342/372 |
| 5,943,011 | 8/1999 | Acoraci et al. .......................... | 342/373 |

Primary Examiner—William A. Cuchlinski, Jr.
Assistant Examiner—Olga Hernandez
Attorney, Agent, or Firm—Sprung Kramer Schaefer & Briscoe

[57] ABSTRACT

Communications equipment for use in a combat vehicle with at least one transmitting antenna and at least one receiving antenna and with more communications terminals than transmitting antennas or receiving antennas. Control logic accordingly contains a signal-path matrix by which any communications terminal can be connected, depending on its operating state "transmit" or "receive", either to a transmitting antenna along a high-frequency transmission path that includes a power adder or to the receiving antenna along a high-frequency reception path that includes a level distributor.

7 Claims, 2 Drawing Sheets

COMMUNICATIONS EQUIPMENT IN A COMBAT VEHICLE

BACKGROUND OF THE INVENTION

The present invention concerns communications equipment in a combat vehicle with at least one transmitting antenna and at least one receiving antenna and with more communications terminals than transmitting antennas or receiving antennas.

The need for communications has been constantly increasing lately in the military field as well. Contemporary combat vehicles are accordingly provided with several communications terminals. These terminals not only communicate general information but also individually between specified system components (data terminals and parties to discussions). Because of the statistical independence of the data being communicated, there is no fixed schematics for the interchange of data between various communications systems.

There is accordingly a need in principle for reliable parallel operation of all communications terminals, within the same frequency band if necessary. At the current state of the art, each combat vehicle has an antenna for each terminal, meaning that several antennas must often be mounted on one and the same vehicle. In the extreme case, combat vehicles of the most recent generation would need six or more antennas to handle all the necessary signal paths. The need for so many antennas, which high-frequency technology requires to be far enough apart from one another, directly contradicts another need, for small and extremely mobile vehicles of high combat effectiveness. The situation is rendered particularly problematic by the concomitant needs for radar antennas, which, like pivoting weapons, must have access to the azimuth unimpeded by other antennas, and for antennas employed to sense the coordinates of the vehicle in space.

There is accordingly a need to couple as many communications terminals as possible with a minimum of antennas. An ideal solution would be to decrease the number of antennas employed in any particular frequency band. This solution, however, is not technically feasible because operation of the separate terminals could not be ensured in all conceivable situations. The terminals would "jam" one another.

SUMMARY OF THE INVENTION

The object of the present invention is to improve communications equipment of the aforesaid type to the extent that a single combat vehicle will need a minimum of antennas, typically two.

This object is attained in accordance with the present invention by control logic containing a signal-path matrix by means of which any communications terminal can be connected, depending on its operating state "transmit" or "receive", either to a transmitting antenna along a high-frequency transmission path that includes a power adder or to the receiving antenna along a high-frequency reception path that includes a level distributor.

It has been demonstrated of advantage to control the signal-path matrix with signals that also switch the communications terminal from one operating state to the other and are supplied to the control logic. It is, however, also possible to control the signal-path matrix with signals synthesized from signals available externally at the communications terminal but not explicitly employed to switch from one operating state to the other.

The principle that the present invention is based on is to employ only one antenna for the transmission path and one antenna for the reception path. This powerful reduction in the number of antennas is possible because of an operations unit in the form of a control logic that contains a signal-path matrix. This assembly switches the high-frequency transmission path associated with the individual communications terminals, radios for example, between a transmission path that includes a power adder and, for receiving, a reception path that includes a level distributor. Signals that perform the same function in the communications terminals can be employed to control the signal-path matrix. These control signals, however, can also be synthesized from signals available externally at the radio while having no fundamental effect in switching between the "transmit" and the "receive" state. The switching will prevent the receiver from "jamming" even while the other terminals are transmitting. Since the communications terminal can in accordance with the present principle usually be operated at low power, there will be a small power deficit at the transmitting antenna. This deficit, however, can be compensated very easily with an appropriate amplifier, dimensioned to act as a transmission amplifier. The essential advantage to operating the terminals at low transmission power is to decrease the overall power in the power-adder and transmission-path system and accordingly better protect the receiver's input stages. The antenna controls will, however, in principle be dimensioned to prevent damage to the communications terminals even while they are all emitting at their rated transmission power. When one or more terminals are receiving, the signal-path matrix will be controlled in the "receive" state with respect to those terminals. The high-frequency path of the particular terminal will accordingly be connected to the level-distributor reception path, to the receiving antenna, that is. It must be remembered, however, that both the power distribution and a filter that is to be provided will decrease receiver-input power in relation to the base of the antenna. Still, this situation can be compensated with a reception amplifier.

Another advantage of the communications equipment in accordance with the present invention is that the space needed to accommodate any inset antenna-drive mechanism will be definitely smaller and hence easier to ensure than in conventional systems.

The communications equipment in accordance with the present invention in principle requires only one transmitting antenna and one receiving antenna. It is, however, basically possible to provide several transmitting antennas. A second transmitting antenna allows more effective power distribution when several transmitters are operating at the same time. This version of the principle also provides more redundancy due to the increased antenna resources. Such redundancy admittedly complicates the control logic because the multiplicity of available transmitting antenna means that the optimal association of transmitting units to available antennas must always be determined.

Several receiving antennas can also be employed no matter what the constellation in the transmitting branch happens to be. This potential is of particular interest in situations where it would seem of advantage to exploit spatial diversity. Examples are applications in areas with a number of geologically dictated reflectors or those with a large number of buildings. Here as well of course there is need for a complex (intelligent) control logic. Even in such cases, however, the high redundancy will be available.

One embodiment of the present invention will now be specified with reference to the accompanying drawing, wherein:

DETAILED DESCRIPTION OF THE INVENTION

Figure 1:
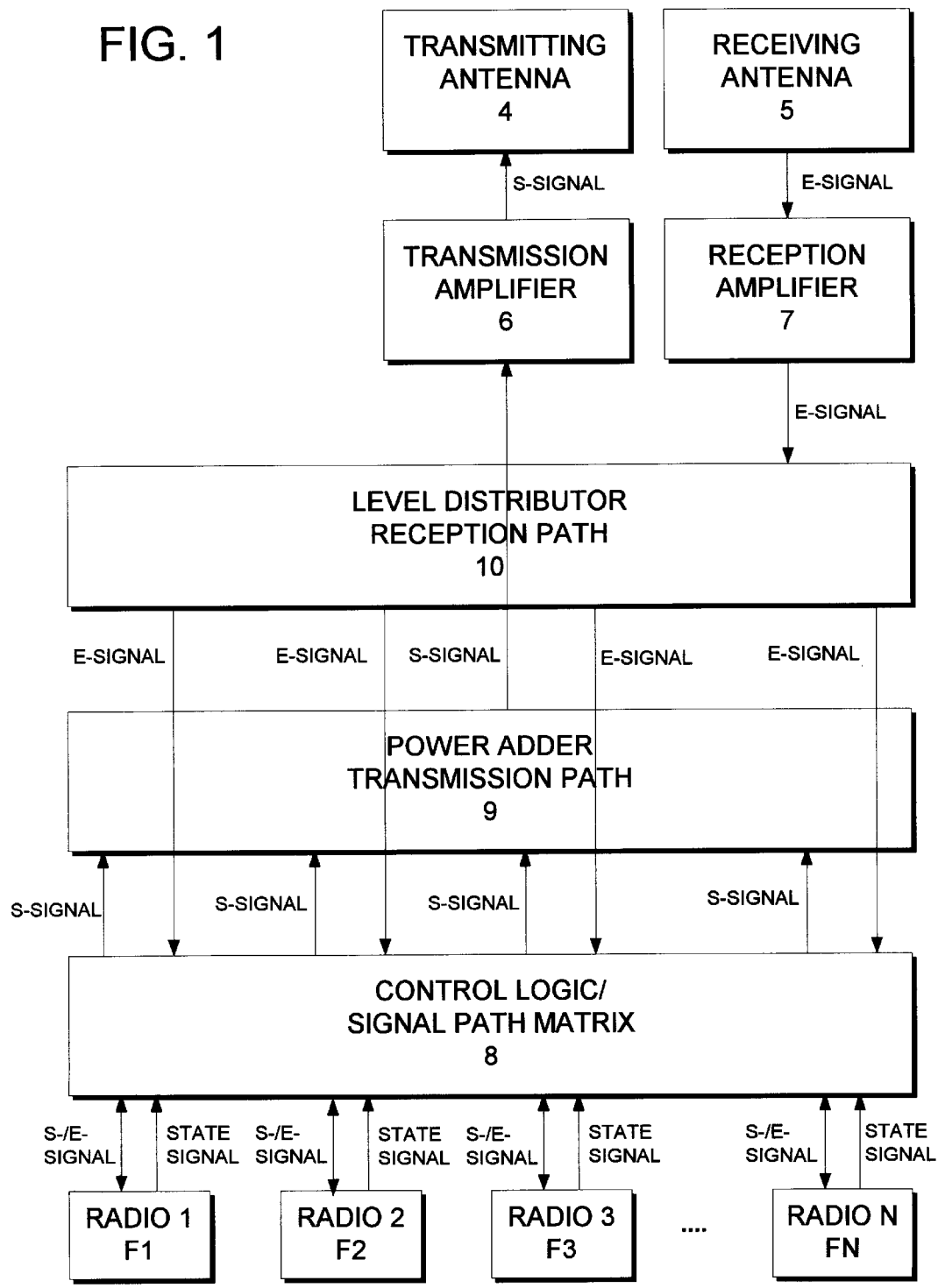
FIG. 1 is a block diagram of communications equipment with one transmitting antenna, one receiving antenna, and N radios
Figure 2:
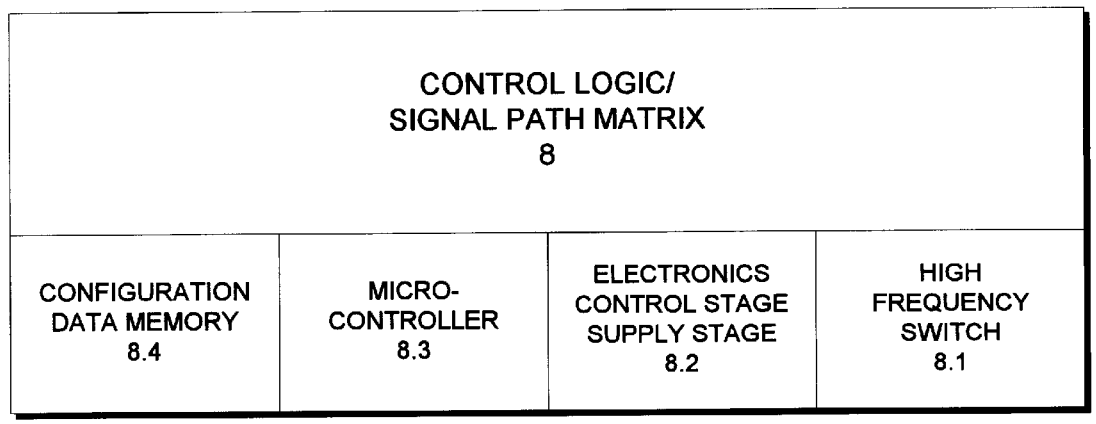
FIG. 2 is a detailed illustration of the equipment's control logic.

The communications equipment illustrated in FIGS. 1 and 2 is intended for installation in an otherwise unillustrated combat vehicle, a military tank for example. It incorporates radios F1, F2, F3, . . . , FN, a transmitting antenna 4, and a receiving antenna 5.

The high-frequency S/E (send-receive) signal path associated with each radio communicates with a control-logic and signal-path matrix 8. Control signals are also forwarded from the radios to matrix 8.

As will be evident from FIG. 2, control-logic and signal-path matrix 8, which is illustrated in more detail, includes a variable high-frequency switch 8.1, electronics 8.2, microcontroller 8.3, and a configuration-data memory 8.4. Switch 8.1 constitutes a signal matrix, memory 8.4 communicates with microcontroller 8.3, and electronics 8.2 are specifically programmed and comprise a control stage and a supply stage.

Microcontroller 8.3 determine the optimal connections between the individual radios F1, F2, F3, . . . FN and the available antennas, specifically transmitting antenna 4 and receiving antenna 5, depending on the system's particular demands and resources, which are stored in memory 8.4, and in accordance with signals-theoretical formulas and physical laws. This process is controlled by the control signals leaving the radios, each of which indicates whether the radio is in the "transmit" or in the "receive" state. The connection data computed by microcontroller 8.3 are forwarded to the control stage of electronics 8.2. Signals appropriate for controlling the signal matrix's switch 8.1 are generated in the control stage. These signals connect radios F1, F2, F3, . . . FN either to transmitting antenna 4 by way of power-adder and transmission-path 9 and a transmission amplifier 6 or to receiving antenna 5 by way of level-distributor and reception-path 10 and reception amplifier 7.

The supply stage of electronics 8.2 provides access to both the direct-current power that controls both antennas and the voltage required for the antenna-pass networks and amplifiers.

What is claimed is:

1. Communications equipment for use in a combat vehicle with at least one transmitting antenna and at least one receiving antenna and with more communications terminals than transmitting antennas or receiving antennas, comprising: control logic having a signal-path matrix for connecting any of the communications terminals to a transmitting antenna along a high-frequency transmission path that includes a power adder or to a receiving antenna along a high-frequency reception path that includes a level distributor depending on a transmit or receive operating state of the terminal.

2. The communications equipment as in claim 1, wherein the signal-path matrix is controlled with signals that also switch the communications terminals from one operating state to the other and are supplied to the control logic.

3. The communications equipment as in claim 1, wherein the signal-path matrix is controlled with signals synthesized from signals available externally at the communications terminal but not explicitly employed to switch from one operating state to the other.

4. The communications equipment as in claim 1, further comprising a transmission amplifier upstream of every transmitting antenna.

5. The communications equipment as in claim 1, further comprising a reception amplifier downstream of every receiving antenna.

6. The communications equipment as in claim 1, wherein the control logic includes variable high-frequency switches that constitute the signal-path matrix, a programmable microcontroller, a configuration-data memory communicating with the microcontroller, wherein the microcontroller calculates the optimal connections between the individual communications terminals and the available antennas depending on the system's particular demands and resources, and connection data are forwarded to a control stage of the control logic, which accordingly controls the switches.

7. The communications equipment as in claim 6, wherein the control logic includes a supply stage that generates both direct-current power for controlling all the antennas and the voltage for an antenna-pass network and amplifier.

\* \* \* \* \*